A soothing, cleansing, and beneficial cosmetic facial mask is provided in two parts comprising an oil base, preferably a mixture of almond oil and olive oil, and an aqueous paste of banana flour, dried milk solids. The mask is employed by coating the skin areas to be treated with the oil base and thereafter applying a thick layer of the paste over the oil. The mask is left in place for a period of about thirty to forty minutes and then removed. The oil base will preferably contain a minor amount of Royal Jelly, on the order of about 0.1 to 5.0 weight percent, based on the weight of the oil.

United States Patent [19]
Sutliff et al.

[11] 3,810,996
[45] May 14, 1974

[54] COSMETIC PREPARATION
[76] Inventors: Gloria M. Sutliff, 8105 Kerry Rd., Chevy Chase, Md. 20015; Maria F. Moreno, P.O. Box 5019, Quito, Ecuador
[22] Filed: Mar. 14, 1972
[21] Appl. No.: 234,641

[52] U.S. Cl................. 424/364, 424/358, 424/359, 424/365
[51] Int. Cl............................................... A61k 7/00
[58] Field of Search ............ 424/364, 365, 359, 358

[56] References Cited
UNITED STATES PATENTS
3,118,810  1/1964  Vonkennel......................... 424/365
3,340,153  9/1967  Kast................................... 424/359

Primary Examiner—Albert T. Meyers
Assistant Examiner—Frederick E. Waddell
Attorney, Agent, or Firm—Fiedlman, Wolffe, Leitner & Hiney

[57] ABSTRACT

5 Claims, No Drawings

COSMETIC PREPARATION

The present invention relates to a cosmetic preparation for cleansing and soothing the skin.

The object of the present invention is to provide a cosmetic preparation of two component parts separately applied that will have a particularly efficient effect in cleansing the skin and in producing a soothing and pleasant effect.

The cosmetic preparation according to the present invention contains, on the one hand, an aqueous paste of banana flour and powdered dried milk solids, and on the other hand, a base composition comprising a mixture of oils. The oil base composition can be prepared from any suitable vegetable or mineral oil recognized as suitable for external pharmaceutical use. A preferred composition will be a mixture of almond oil and olive oil in approximately equal proportions. A further preferred ingredient in the oil base is a minor amount, e.g. about 0.1 to 5.0 weight percent, of Royal Jelly.

The role of the oil base in the present invention is that primarily of preventing the aqueous paste composition from adhering to the skin, and in addition to penetrate into the pores, folds, and the like of the skin to enhance the cleansing, moisturizing and stimulating effect of the composition.

The paste composition is constituted of dry milk solids, employing whole milk solids for dry skin or non-fat dried milk for oily skin, combined with banana flour, i.e. dried and ground bananas. The principal ingredients, i.e. the banana flour and the powdered milk are blended together and combined with sufficient hot water to form a thick paste.

The employment of the two component composition of the present invention is as follows:

The skin is thoroughly cleansed and dried and the oil based composition is applied over the area to be treated. Thereafter, the aqueous paste composition is applied over the oil in a thick layer completely covering the area to be treated. Best results are attained when the area under treatment is completely relaxed and motionless during the period of treatment. The composition is left in place for a period of about 30 to 40 minutes, which should be an insufficient period to permit the paste to dry completely, after which the composition is gently removed by peeling and the face rinsed with warm water.

The composition and method of the present invention will be understood with reference to the following example, which is intended to exemplify the composition, the method of its preparation, and the method of its use. The example is not intended to be limiting, however, but merely to serve as a guide to those of ordinary skill in the art in the formulation and employment of the composition:

EXAMPLE

An aqueous paste composition is formulated from one ounce of banana flour, seven ounces of dried whole milk and three ounces of hot water. The composition is blended into a smooth, even consistency and results in a thick coherent paste.

Separately combine one-half ounce of almond oil, one-half ounce of olive oil and one-eighth ounce of Royal Jelly and thoroughly mix.

A subject was treated in accordance with the present invention as follows:

The subject thoroughly cleansed the face and throat with cold cream to remove all make-up and superficial dirt. The oil base of the present invention was spread evenly over the face and throat areas and thereafter the aqueous paste composition was applied in a thick layer over the entire area. The subject reclined in a supine position substantially motionless for a period of about thirty minutes. At that point, the paste composition had partially dried into a coherent layer which was gently peeled off the skin and the area was rinsed with warm water. An examination revealed a deep and thorough cleansing of the surface and pores of the treated skin. In addition, the subject reported an extremely pleasant sensation during the period of treatment.

While certain proportions have been employed in preferred formulations, it should be understood that there is no intent that the scope of the invention should be so limited. It will be readily apparent to those of ordinary skill in the art that the various proportions can be varied substantially without departing from the intent and spirit of the invention. In particular, the aqueous paste composition should contain a preponderant amount of milk solids, on the order of about eighty to ninety percent (80–90 %), on a weight basis, preferably about 85 percent, of the dry constituents. The balance, i.e., about 10–20 percent, preferably about 15 percent, will be the banana flour. These are combined with an appropriate amount of water to form a smooth paste of suitable consistency to be readily spread on the face, and sufficient stiffness to be adherent when so applied.

What is claimed is:

1. The method of soothing and cleansing skin comprising:
   a. applying thereto a mixture of almond oil and olive oil in about equal portions evenly over the face,
   b. applying over said mixture a thick layer of an aqueous paste consisting essentially of about 80 to 90 percent by weight dry milk solids, about 10 to 20 percent by weight banana flour, said percent by weight being based on the combined weight of milk solids and banana flour, and sufficient water to form a smooth paste, and
   c. removing said paste by peeling it from the face.

2. A composition for use in forming a cosmetic facial mask consisting essentially of an aqueous paste of about 10 to 20 percent banana flour, about 80–90 percent by weight dry milk solids, said percent by weight being based on the combined weight of milk solids and banana flour, and water in amount sufficient to form a smooth aqueous paste.

3. The composition of claim 2 wherein said aqueous paste contains about one part by weight banana flour, about four parts by weight dried milk solids, about three parts by weight of water and further includes about one-eighth part by weight Royal Jelly.

4. The method of claim 1 wherein said aqueous paste comprises about one part by weight banana flour, four parts by weight dried milk solids, three parts by weight water and further includes one-eighth part by weight of Royal Jelly.

5. The method of claim 1 wherein said paste composition is permitted to remain in place for a period of about 30 to 40 minutes.

* * * * *